US008980437B2

(12) United States Patent
Cimpeanu et al.

(10) Patent No.: US 8,980,437 B2
(45) Date of Patent: Mar. 17, 2015

(54) USE OF POLYELECTROLYTE COMPLEXES FOR PRODUCING POLYMER FOILS WITH OXYGEN-BARRIER PROPERTIES

(75) Inventors: Carmen-Elena Cimpeanu, Ludwigshafen (DE); Thomas Breiner, Laudenbach (DE); Dieter Urban, Speyer (DE); Karl-Heinz Schumacher, Neustadt (DE); Volker Schaedler, Ann Arbor, MI (US); Heiko Diehl, Mannheim (DE); Hermann Seyffer, Heidelberg (DE)

(73) Assignee: BASF SE, Ludwigshafen (DE)

( * ) Notice: Subject to any disclaimer, the term of this patent is extended or adjusted under 35 U.S.C. 154(b) by 204 days.

(21) Appl. No.: 13/389,680

(22) PCT Filed: Aug. 17, 2010

(86) PCT No.: PCT/EP2010/061925
§ 371 (c)(1),
(2), (4) Date: Feb. 9, 2012

(87) PCT Pub. No.: WO2011/023587
PCT Pub. Date: Mar. 3, 2011

(65) Prior Publication Data

US 2012/0148855 A1 Jun. 14, 2012

(30) Foreign Application Priority Data

Aug. 24, 2009 (EP) .................................... 09168479

(51) Int. Cl.
*B32B 27/08* (2006.01)
*B05D 7/00* (2006.01)
*B05D 5/00* (2006.01)

(52) U.S. Cl.
CPC .. *B05D 5/00* (2013.01); *B05D 7/00* (2013.01); *B05D 7/56* (2013.01)
USPC ........................................ 428/520; 427/407.1

(58) Field of Classification Search
None
See application file for complete search history.

(56) References Cited

U.S. PATENT DOCUMENTS 4,704,324 A * 11/1987 Davis et al. ................ 428/308.4
4,927,540 A * 5/1990 Wessling et al. .............. 210/638
6,060,410 A * 5/2000 Gillberg-LaForce et al. 442/118
6,486,245 B1 * 11/2002 Thunemann et al. ......... 524/130
6,524,569 B1 * 2/2003 Stratford et al. ............. 424/78.1
2003/0055149 A1 3/2003 McGee
2007/0031564 A1 * 2/2007 Fontanesi et al. ............. 426/557
2007/0031654 A1 2/2007 Posey
2010/0143434 A1 * 6/2010 Schaaf et al. ................. 424/422
2010/0291169 A1 * 11/2010 Toreki et al. .................. 424/405
2011/0143156 A1 * 6/2011 Cimpeanu et al. ......... 428/479.6
2011/0189487 A1 8/2011 Zacharias et al.
2011/0305916 A1 12/2011 Schmidt-Thümmes et al.

FOREIGN PATENT DOCUMENTS

| | | |
|---|---|---|
| CN | 1326486 A | 12/2001 |
| CN | 1857918 A | 11/2006 |
| DE | 10 2005 007 483 | 8/2006 |
| EP | 1 958 707 | 8/2008 |
| EP | 2 014 730 | 1/2009 |
| JP | 11-314669 | 11/1999 |
| JP | 5-0302002 | 6/2013 |
| WO | 98 31719 | 7/1998 |
| WO | WO 00/29481 A1 | 5/2000 |
| WO | 03 068869 | 8/2003 |
| WO | 2007 002322 | 1/2007 |
| WO | 2010 020581 | 2/2010 |

OTHER PUBLICATIONS

Office Action issued Aug. 9, 2013 in Chinese Patent Application No. 201080037543.0 (submitting English translation only).
International Search Report issued on Oct. 7, 2011 in PCT/EP10/061925 filed on Aug. 17, 2010.
U.S. Appl. No. 13/391,143, filed Feb. 17, 2012, Cimpeanu, et al.
Office Action as received in the corresponding Japanese Patent Application No. 2012-526000 dated Jun. 23, 2014 (English Translation only).

* cited by examiner

*Primary Examiner* — Sheeba Ahmed
(74) *Attorney, Agent, or Firm* — Oblon, McClelland, Maier & Neustadt, L.L.P.

(57) ABSTRACT

The use of polyelectrolyte complexes is described, for providing an oxygen barrier to packaging materials made of polymer foils. Polymeric components of the polyelectrolyte complex are applied in polymerized form to the polymer foil. The polymer foil is either coated with an aqueous dispersion comprising a dispersed polyelectrolyte complex previously produced by water-in-water emulsion polymerization, or is coated with a composition comprising a polyelectrolyte complex produced from anionic polymer and from cationic surfactant, or the polymer foil is coated with at least three alternating layers, where respectively one of two adjacent layers comprises an anionic polyelectrolyte component and the other of two adjacent layers comprises a cationic polyelectrolyte component, and polyelectrolyte complexes form at the opposite, adjacent interfaces of the alternating layers.

15 Claims, No Drawings

USE OF POLYELECTROLYTE COMPLEXES FOR PRODUCING POLYMER FOILS WITH OXYGEN-BARRIER PROPERTIES

This application is a National Stage of PCT/EP10/061925 filed Aug. 17, 2010 and claims the benefit of EP 09168479.5 filed Aug. 24, 2009.

The invention relates to the use of polyelectrolyte complexes for providing an oxygen barrier for packaging materials made of polymer foils. Polymeric components of the polyelectrolyte complex are applied in polymerized form to the polymer foil. The polymer foil is either coated with an aqueous dispersion comprising a dispersed polyelectrolyte complex previously produced by water-in-water emulsion polymerization, or is coated with a composition comprising a polyelectrolyte complex produced from anionic polymer and from cationic surfactant, or the polymer foil is coated with at least three alternating layers, where respectively one of two adjacent layers comprises an anionic polyelectrolyte component and the other of two adjacent layers comprises a cationic polyelectrolyte component, and polyelectrolyte complexes form at the opposite, adjacent interfaces of the alternating layers.

When products that are susceptible to oxidation or are sensitive to oxygen are packaged it is important that the packaging materials used have oxygen-barrier properties, i.e. that they have minimum oxygen transmission or minimum oxygen permeability. Polymer foils used as packaging materials and made by way of example of polyolefins, such as polyethylene, or of oriented polypropylene, or of polyesters, e.g. polyethylene terephthalate, generally have relatively high oxygen permeability when they are used as they stand in uncoated form, and various measures have therefore been proposed for increasing the oxygen-barrier properties of these packaging materials.

WO 03/068869 describes a process for producing means of packaging with oxygen-barrier properties, where a backing material is coated with a polymerizable compound, and the compound is then polymerized on the backing material. EP 2 014 730 describes a coating composition for forming a gas-barrier film based on a polycarboxylic acid polymer, crosslinked by means of a zinc compound.

WO 07/002322 describes coated polymer films with oxygen-barrier properties. The coating composition is a solution of a maleic acid/acrylic acid copolymer and of a vinyl alcohol/vinylamine copolymer. After the coating process, the two copolymers of the coating composition crosslink on the polymer film. WO 98/31719 describes coating compositions for barrier coatings. The compositions comprise an ethylenically unsaturated acid monomer and a polyamine, comprising an incorporated crosslinking agent. After the coating process, crosslinking takes place via initiation of a free-radical-induced polymerization reaction.

Packaging foils known hitherto with oxygen-barrier properties are not yet entirely satisfactory. Problems often encountered are that the oxygen permeabilities are not yet sufficiently low for every application, or that barrier coatings using polymer-based films do not have sufficient flexibility. If buckling or creasing then occurs, the barrier film can be damaged in the region of creases, and this can result in inadequate barrier action.

It was an object of the present invention to provide further compositions and processes which permit production of packaging with good oxygen-barrier properties, in particular in creased, buckled, and angled regions. This packaging should have the best possible resistance to temperature changes, flexibility, and blocking resistance, and should comprise the smallest possible amount of substances hazardous to health, e.g. metals.

The invention provides the use of at least one polyelectrolyte complex for providing an oxygen barrier for packaging materials made of polymer foils, where polymeric components of the polyelectrolyte complex are applied in polymerized form to the polymer foil, and where at least one side of at least one polymer foil is either coated with an aqueous dispersion comprising a dispersed polyelectrolyte complex previously produced by water-in-water emulsion polymerization, or is coated with a composition comprising a polyelectrolyte complex previously produced from anionic polymer and from cationic surfactant, or where at least one side of a polymer foil is coated with at least three alternating layers, where respectively one of two adjacent layers comprises at least one anionic polyelectrolyte component and the other of two adjacent layers comprises at least one cationic polyelectrolyte component, and polyelectrolyte complexes form at the opposite, adjacent interfaces of the at least three alternating layers.

The invention also provides a coated polymer foil obtainable via the use according to the invention, wherein at least one side of the polymer foil has been coated with at least three alternating layers, where respectively one of two adjacent layers comprises at least one anionic polyelectrolyte component and the other of two adjacent layers comprises at least one cationic polyelectrolyte component, and polyelectrolyte complexes form at the opposite, adjacent interfaces of the at least three alternating layers.

The coating produced according to the invention using the polyelectrolyte complex has oxygen-barrier properties. The barrier properties can be measured by the permeability test described in the examples. The term oxygen-barrier property means that oxygen transmission or oxygen permeability has been reduced in comparison with an uncoated substrate. The oxygen permeability of polymer foils coated according to the invention is preferably less than 30%, in particular less than 20%, or less than 10%, e.g. from 1 to 3%, of the value for the uncoated polymer foil (measured at 23° C. and 0% relative humidity).

In one embodiment, a moisture-protection system is provided for the oxygen-barrier layer comprising the polyelectrolyte complex, in order to eliminate, or at least greatly reduce, any impairment of the barrier action due to high humidity. The moisture-protection system can be provided via an additional coating which has barrier action with respect to water vapor or humidity. As an alternative, or in addition, it is also possible to carry out coextrusion with a material of this type, examples of suitable materials being polyolefins, in particular polyethylene. The moisture-protection system is preferably formed via coating with a polyolefin or via coextrusion of a polyolefin with at least one substance selected from polyelectrolyte complexes, anionic polyelectrolyte components, and anionic polyelectrolyte components.

Polyelectrolytes are ionic polymers. For the purposes of the invention, polyelectrolyte complexes are the reaction products of oppositely charged ionic polyelectrolyte components, where at least one of the components is a cationic or anionic polymer. Examples of polyelectrolyte complexes that can be used according to the invention are those formed from an anionic polymer and from a cationic polymer, or from an anionic polymer and from a non-polymeric, cationic surfactant, or from cationic polymer and from a non-polymeric, anionic surfactant. Preference is given to polyelectrolyte complexes made of cationic polymer and of anionic polymer or made of an anionic polymer and of non-polymeric, cationic surfactant. The polyelectrolyte complexes generally have a defined stoichiometric constitution, i.e. the equivalence ratio of anionic and cationic groups in these complexes is, or is in the vicinity of, 1. However, the polyelectrolyte complexes can also have predominantly anionic charge or predominantly cationic charge. According to the invention, another possibility, alongside polyelectrolyte complexes of this type, is that a cationic or anionic polymer is also present in excess, i.e. in free, uncomplexed form.

In one embodiment of the invention, aqueous dispersions of polyelectrolyte complexes are used. These polyelectrolyte dispersions can be produced via what is known as water-in-water emulsion polymerization. These are ionically stabilized, homogeneously dispersed complexes made of anionic polymer and of cationic polymer. The polyelectrolyte complexes preferably have, based on the monomers incorporated, predominantly cationic charge, at low pH. The dispersions can be obtained via free-radical polymerization of ethylenically unsaturated anionic monomers in an aqueous medium in the presence of at least one cationic polymer, at a suitable pH. In one embodiment, the amount used of the anionic monomers is such that the number of anionic groups in the anionic monomers is less by at least 1 mol % than the number of cationic groups in the cationic polymers, measured at pH 2.7 and 20° C. A suitable production process is described by way of example in DE 10 2005 007 483.

The amount of cationic polymer used to produce the dispersed polyelectrolyte complex is preferably judged in such a way that, per mole of the cationic groups of the cationic polymer or, respectively, in the entirety of the cationic monomers used in the polymerization reaction, the amount used of anionic groups of at least one anionic polymer is, for example, up to 150 mol %, or up 100 mol %, preferably from 1 to 99 mol %, or from 10 to 80 mol %, measured at pH 2.7 and 20° C. The polyelectrolyte complexes produced using less than 100 mol % of anionic groups have predominantly cationic charge at pH 2.7 and 20° C.

Anionic polymers are polymers having anionic groups, in particular organic polymers having carboxylate, phosphate, or sulfate groups. It is also possible to use the corresponding acids, as long as they are either neutralized by bases comprised within the reaction medium or are converted into anionic groups by basic groups of the cationic polymer. Examples of suitable anionic polymers are those formed by free-radical polymerization of ethylenically unsaturated anionic polymers capable of free-radical polymerization. This group also comprises copolymers made of at least one anionic monomer and of one or more than one different non-ionic copolymerizable monomer(s).

Examples of ethylenically unsaturated anionic monomers that can be used are monoethylenically unsaturated $C_3$ to $C_{10}$ or $C_3$ to $C_5$ carboxylic acids, such as acrylic acid, methacrylic acid, ethacrylic acid, crotonic acid, maleic acid, fumaric acid, vinylsulfonic acid, styrenesulfonic acid, acrylamidomethylpropanesulfonic acid, vinyiphosphonic acid, itaconic acid, and the alkali-metal salts, alkaline-earth-metal salts, or ammonium salts of these acids. Among the anionic monomers preferably used are acrylic acid, methacrylic acid, maleic acid, and 2-acrylamido-2-methylpropanesulfonic acid. Particular preference is given to aqueous dispersions of polymers based on acrylic acid. The anionic monomers can either be polymerized alone to give homopolymers or else can be polymerized in a mixture with one another to give copolymers. Examples of these are the homopolymers of acrylic acid, homopolymers of methacrylic acid, copolymers of acrylic acid and maleic acid, copolymers of acrylic acid and methacrylic acid, and copolymers of methacrylic acid and maleic acid.

However, the anionic monomers can also be polymerized in the presence of at least one other ethylenically unsaturated monomer. These monomers can be nonionic or else can bear a cationic charge. Examples of nonionic comonomers are acrylamide, methacrylamide, N—$C_1$ to $C_3$-alkylacrylamides, N-vinylformamide, acrylic esters of monohydric alcohols having from 1 to 20 carbon atoms, e.g. in particular methyl acrylate, ethyl acrylate, isobutyl acrylate, and n-butyl acrylate, methacrylic esters of monohydric alcohols having from 1 to 20 carbon atoms, e.g. methyl methacrylate and ethyl methacrylate, and also vinyl acetate and vinyl propionate.

Suitable cationic monomers which can be copolymerized with the anionic monomers are dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyldimethylammonium chloride, vinylimidazole, and also the respective basic monomers neutralized with acids and/or quaternized. Individual examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamid, and diethylaminopropylacrylamide.

The basic monomers can have been completely or only to some extent neutralized and, respectively, quaternized, for example to an extent of from 1 to 99% in each case. Preferred quaternizing agent used for the basic monomers is dimethyl sulfate. However, the monomers can also be quaternized with diethyl sulfate or with alkyl halides, such as methyl chloride, ethyl chloride, or benzyl chloride. The amount used of the cationic monomers is at most such that the resultant polyelectrolyte complexes bear a net charge which is anionic at pH<6.0 and a temperature of 20° C. The excess of anionic charge in the resultant amphoteric polymers is, for example, at least 5 mol %, preferably at least 10 mol %.

Examples of the amounts used of the comonomers in the production of the anionic polyelectrolyte complexes are such that the resultant polymer dispersions are water-soluble when diluted with water at pH above 7.0 and at a temperature of 20° C., and have an anionic charge. Examples of the amount of nonionic and/or cationic comonomers, based on the total amount of monomers used in the polymerization reaction, are from 0 to 99% by weight, preferably from 5 to 75% by weight, and mostly an amount in the range from 5 to 25% by weight.

Examples of preferred copolymers are copolymers made of from 25 to 90% by weight of acrylic acid and from 75 to 10% by weight of acrylamide. It is preferable to polymerize at least one ethylenically unsaturated $C_3$ to $C_5$ carboxylic acid in the absence of other monoethylenically unsaturated monomers. Particular preference is given to homopolymers of acrylic acid, obtainable via free-radical polymerization of acrylic acid in the absence of other monomers.

In one embodiment, the anionic polymer comprises 2-acrylamido-2-methylpropane-sulfonic acid (AMPS). It is preferable to copolymerize acrylic acid with AMPS. The amount of AMPS here can be, for example, from 0.1 to 15 mol % or from 0.5 to 10 mol %, based on the amount of all of the monomers.

The polymerization reaction can also be conducted in the presence of at least one crosslinking agent. This then gives copolymers with higher molar mass than when the anionic monomers are polymerized in the absence of any crosslinking agent. Incorporation of a crosslinking agent into the polymers moreover gives reduced solubility of the polymers in water. As a function of the amount of copolymerized crosslinking agent, the polymers become insoluble in water, but are swellable in water. Crosslinking agents used can comprise any of the compounds that have at least two ethylenically unsaturated double bonds within the molecule. Examples of crosslinking agents are triallylamine, the triallyl ether of pentaerythritol, the tetraallyl ether of penta-erythritol, methylenebisacrylamide, N,N'-divinylethyleneurea, allyl ethers comprising at least two allyl groups, or vinyl ethers having at least two vinyl groups, where these ethers derive from polyhydric alcohols, e.g. sorbitol, 1,2-ethanediol, 1,4-butanediol, trimethylolpropane, glycerol, diethylene glycol, and from sugars, such as sucrose, glucose, mannose; other examples are dihydric alcohols which have from 2 to 4 carbon atoms and which have been completely esterified with acrylic acid or with methacrylic acid, e.g. ethylene glycol dimethacrylate, ethylene glycol diacrylate, butanediol dimethacrylate, butanediol diacrylate, diacrylates or dimethacrylates of polyethylene glycols with molecular weights from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate, and triallylmethylammonium chloride. If crosslinking agents are used in the production of the dispersions of the invention, examples of the respective amounts used of crosslinking agent are from 0.0005 to 5.0% by weight, preferably from 0.001 to 1.0% by weight, based on the entirety of monomers used in the polymerization reaction. Crosslinking agents preferably used are the triallyl ether of pentaerythritol, the tetraallyl ether of pentaerythritol, N,N'-divinylethyleneurea, allyl ethers of sugars such as sucrose, glucose or mannose, where these ethers comprise at least two allyl groups, and triallylamine, and also mixtures of these compounds.

If at least one anionic monomer is polymerized in the presence of at least one crosslinking agent, it is preferable to produce crosslinked copolymers of acrylic acid and/or methacrylic acid by polymerizing acrylic acid and/or methacrylic acid in the presence of the triallyl ether of pentaerythritol, the tetraallyl ether of pentaerythritol, N,N'-divinylethyleneurea, allyl ethers of sugars such as sucrose, glucose or mannose, where these ethers comprise at least two allyl groups, and triallylamine, and also mixtures of these compounds. As a function of the amounts of crosslinking agents used in the polymerization reaction, the resultant polyelectrolyte complexes are soluble or swellable in dilute aqueous solution at pH>7.0.

The cationic polymers used to form the polyelectrolyte complexes are preferably water-soluble, i.e. they have at least 1 g/l solubility in water at 20° C. Cationic polymers are polymers having cationic groups, in particular organic polymers having quaternary ammonium groups. It is also possible to use polymers having primary, secondary, or tertiary amine groups, as long as they are protonated either by acids comprised within the reaction medium or by acid groups of the anionic polymer, thus being converted to cationic groups. The amine groups or ammonium groups of the cationic polymer here can be present in the form of substituents or as a portion of the polymer chain. They can also be a portion of an aromatic or non-aromatic ring system.

Examples of suitable cationic polymers are those from the following group:

(a) polymers comprising vinylimidazolium units,
(b) polydiallyldimethylammonium halides,
(c) polymers comprising vinylamine units,
(d) polymers comprising ethyleneimine units,
(e) polymers comprising dialkylaminoalkyl acrylate units and/or comprising dialkylaminoalkyl methacrylate units, and
(f) polymers comprising dialkylaminoalkylacrylamide units and/or comprising dialkylaminoalkyl methacrylamide units.

Examples of cationic polymers are (a) homopolymers of vinylimidazolium methosulfate and/or copolymers of vinylimidazolium methosulfate and N-vinylpyrrolidone,
(b) polydiallyldimethylammonium chlorides,
(c) polyvinylamines,
(d) polyethyleneimines,
(e) polydimethylaminoethyl acrylate, polydimethylaminoethyl methacrylate, copolymers of acrylamide and dimethylaminoethyl acrylate, and copolymers of acrylamide and dimethylaminoethyl methacrylate, where the basic monomers can also be present in the form of the salts with mineral acids, or in quaternized form, and
(f) polydimethylaminoethylacrylamide, polydimethylaminoethylmethacrylamide, and copolymers of acrylamide and dimethylaminoethylacrylamide.

The basic monomers can also be present in the form of the salts with mineral acids, or in quaternized form. The average molecular weights $M_w$ of the cationic polymers are at least 500. By way of example, they are in the range from 500 to 1 million, preferably from 1000 to 500000, or from 2000 to 100000.

It is preferable to use the following as cationic polymers:

(a) homopolymers of vinylimidazolium methosulfate and/or copolymers of vinylimidazolium methosulfate and N-vinylpyrrolidone with average molecular weight $M_w$ of from 500 to 500000 in each case,
(b) polydiallyldimethylammonium chlorides with average molecular weight $M_w$ of from 1000 to 500000,
(c) polyvinylamines with average molecular weight Mw of from 500 to 1 million, and
(d) polyethyleneimines with average molecular weight $M_w$ of from 500 to 1 million.

The copolymers listed under (a) of vinylimidazolium methosulfate and N-vinylpyrrolidone comprise by way of example from 10 to 90% by weight of copolymerized N-vinylpyrrolidone. Instead of N-vinylpyrrolidone it is possible to use, as comonomer, at least one compound from the group of the ethylenically unsaturated $C_3$ to $C_5$ carboxylic acids, particular examples being acrylic acid or methacrylic acid, or to use the esters of these carboxylic acids with monohydric alcohols comprising from 1 to 18 carbon atoms, e.g. methyl acrylate, ethyl acrylate, isopropyl acrylate, n-butyl acrylate, isobutyl acrylate, methyl methacrylate, ethyl methacrylate, or n-butyl methacrylate.

A polymer of group (b) that can be used with preference is polydiallyldimethylammonium chloride. Other suitable polymers are copolymers of diallyldimethylammonium chloride and dimethylaminoethyl acrylate, copolymers of diallyldimethylammonium chloride and dimethylaminoethyl methacrylate, copolymers of diallyldimethylammonium chloride and diethylaminoethyl acrylate, copolymers of diallyldimethylammonium chloride and dimethylaminopropyl acrylate, copolymers of diallyldimethylammonium chloride and dimethylaminoethylacrylamide, and copolymers of diallyldimethylammonium chloride and dimethylaminopropylacrylamide. The copolymers of diallyldimethylammonium chloride comprise, in copolymerized form by way of example from 1 to 50 mol %, mostly from 2 to 30 mol %, of at least one of the comonomers mentioned.

Polymers (c) comprising vinylamine units are obtainable via polymerization of N-vinylformamide, if appropriate in the presence of comonomers, and hydrolysis of the vinylformamide polymers with elimination of formyl groups to form amino groups. The degree of hydrolysis of the polymers can by way of example be from 1 to 100%, mostly being in the range from 60 to 100%. The average molecular weights $M_w$ are up to 1 million. Polymers comprising vinylamine units are marketed by way of example as Catiofast® from BASF SE.

Polymers of group (d) comprising ethyleneimine units, for example polyethyleneimines, are likewise commercially available products. They are sold by way of example as Polymin® by BASF SE, an example being Polymin® SK. These cationic polymers are polymers of ethyleneimine which are produced via polymerization of ethyleneimine in an aqueous medium in the presence of small amounts of acids or of acid-forming compounds, examples being halogenated hydrocarbons, e.g. chloroform, carbon tetrachloride, tetrachloroethane, or ethyl chloride, or are condensates of epichlorohydrin and compounds comprising amino groups, examples being mono- and polyamines, e.g. dimethylamine, diethylamine, ethylenediamine, diethylenetriamine, and triethylenetetramine, or ammonia. By way of example, they have molecular weights $M_w$ of from 500 to 1 million, preferably from 1000 to 500000.

This group of cationic polymers also includes graft polymers of ethyleneimine on compounds having a primary or secondary amino group, examples being polyamidoamines made of dicarboxylic acids and of polyamines. The ethyleneimine-grafted polyamidoamines can also, if appropriate, be reacted with bifunctional crosslinking agents, for example with epichlorohydrin or with bischlorohydrin ethers of polyalkylene glycols.

Cationic polymers of group (e) that can be used are polymers comprising dialkylaminoalkyl acrylate units and/or comprising dialkylaminoalkyl methacrylate units. These monomers can be used in the polymerization reaction in the form of the free bases, but are preferably used in the form of the salts with mineral acids, such as hydrochloric acid, sulfuric acid, or phosphoric acid, or else in quaternized form. An example of a quaternizing agent that can be used is dimethyl sulfate, diethyl sulfate, methyl chloride, ethyl chloride, cetyl chloride, or benzyl chloride. These monomers can be used to produce either homopolymers or copolymers. Examples of suitable comonomers are acrylamide, methacrylamide, N-vinylformamide, N-vinylpyrrolidone, methyl acrylate, ethyl acrylate, methyl methacrylate, and mixtures of the monomers mentioned.

Cationic polymers of group (f) are polymers comprising dimethylaminoethylacrylamide units or comprising dimethylaminoethylmethacrylamide units, which preferably comprise the basic monomers in the form of the salts with mineral acids, or in quaternized form. These materials can be homopolymers and copolymers. Examples are homopolymers of dimethylaminoethylacrylamide which has been completely quaternized with dimethyl sulfate or with benzyl chloride, homopolymers of dimethylaminoethylmethacrylamide which has been completely quaternized with dimethyl sulfate, with methyl chloride, with ethyl chloride, or with benzyl chloride, and copolymers of acrylamide and dimethyl-sulfate-quaternized dimethylaminoethylacrylamide.

The following cationic polymers are preferably used in the production of the aqueous dispersions of the invention:

(a) homopolymers of vinylimidazolium methosulfate and/or copolymers of vinylimidazolium methosulfate and N-vinylpyrrolidone with average molecular weight $M_w$ of from 1000 to 100000 in each case,
(b) polydiallyldimethylammonium chlorides with average molecular weight $M_w$ of from 2000 to 100000, and/or
(c) polyvinylamines with average molecular weight $M_w$ of from 1000 to 500000. The polyvinylamines are preferably used in the form of the salts with sulfuric acid or hydrochloric acid.

Polymers that can be used as cationic polymers are not only those polymers composed solely of cationic monomers but also amphoteric polymers, with the proviso that the net charge that they bear is cationic. By way of example, the excess of cationic charge in the amphoteric polymers is at least 5 mol %, preferably at least 10 mol %, and mostly in the range from 15 to 95 mol %. Examples of amphoteric polymers having an excess of cationic charge are

- copolymers of acrylamide, dimethylaminoethyl acrylate and acrylic acid, comprising at least 5 mol % more dimethylaminoethyl acrylate than acrylic acid as comonomer;
- copolymers of vinylimidazolium methosulfate, N-vinylpyrrolidone, and acrylic acid, comprising at least 5 mol % more vinylimidazolium methosulfate than acrylic acid as comonomer;
- hydrolyzed copolymers of N-vinylformamide and of an ethylenically unsaturated $C_3$ to $C_5$ carboxylic acid, preferably acrylic acid or methacrylic acid, with at least 5 mol % higher content of vinylamine units than units of ethylenically unsaturated carboxylic acids; and
- copolymers of vinylimidazole, acrylamide, and acrylic acid, where the pH has been selected in such a way that the amount of vinylimidazole cationically charged is at least 5 mol % more than the amount of copolymerized acrylic acid.

Aqueous dispersions of polyelectrolyte complexes can be produced by carrying out free-radical polymerization of the anionic monomers that can be used, if appropriate in the presence of other monomers, in an aqueous medium in the presence of cationic polymers. The amount of basic or, respectively, cationic monomers can be selected in such a way that the resultant polymer complexes always bear an excess of anionic charge, determined at pH 7 and 20° C. The charge density of the polyelectrolytes or polyelectrolyte complexes can be determined by the method of D. Horn, Progr. Colloid & Polymer Sci., volume 65, 251-264 (1978).

Basic polymers are preferably used in the polymerization reaction in the form of the salts with mineral acids or with organic acids, such as formic acid or acetic acid. These salts are in any case formed during the polymerization reaction, because it is conducted at pH<6.0.

The aqueous dispersions which are preferred in the invention and which comprise predominantly anionically charged polyelectrolyte complexes can be produced via free-radical polymerization of ethylenically unsaturated anionic monomers in an aqueous medium in the presence of at least one water-soluble cationic polymer, where the amount used of at least one cationic polymer, per mole of the entirety of the anionic monomers used in the polymerization reaction, is preferably from 0.5 to 49 mol %. The polymerization reaction takes place in an aqueous medium at pH below 6, e.g. in the range from 0 to 5.9, preferably from 1 to 5, and in particular form 1.5 to 3. The pH value that can be used is mostly a consequence of the fact that polymers comprising acid groups are used in the free-acid-group form in the polymerization reaction. The pH can be varied by adding a base, such as in particular aqueous sodium hydroxide solution or potassium hydroxide solution for partial neutralization of the acid groups of the anionic monomers within the stated range. However, to the extent that the starting material comprises the alkali-metal salts, alkaline-earth-metal salts, or ammonium salts of the anionic monomers, a mineral acid is added, or an organic acid, such as formic acid, acetic acid, or propionic acid, in order to adjust the pH.

The polymerization reaction can, if appropriate, also be carried out in the presence of at least one chain transfer agent. The products are then polymers with lower molecular weight than polymers produced without chain transfer agent. Examples of chain transfer agents are organic compounds comprising bonded sulfur, e.g. dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid, and thiourea, aldehydes, organic acids, such as formic acid, sodium formate, or ammonium formate, alcohols, such as in particular isopropanol, and also phosphorus compounds, e.g. sodium hypophosphite. It is possible to use a single chain transfer agent or a plurality of chain transfer agents in the polymerization reaction. If they are used in the polymerization reaction, an example of the amount used of these is from 0.01 to 5.0% by weight, preferably from 0.2 to 1% by weight, based on the entirety of the monomers. The chain transfer agents are preferably used together with at least one crosslinking agent in the polymerization reaction. The rheology of the resultant polymers can be controlled by varying the amount, and the ratio, of chain transfer agent and crosslinking agent. Chain transfer agent and/or crosslinking agent can by way of example be used as an initial charge in the aqueous polymerization medium for the polymerization reaction, or can be fed together with or separately from the monomers to the polymerization mixture, as a function of the progress of the polymerization reaction.

The polymerization reaction usually uses initiators which generate free radicals under the reaction conditions. Examples of suitable polymerization initiators are peroxides, hydroperoxides, hydrogen peroxide, sodium persulfate or potassium persulfate, redox catalysts and azo compounds, such as 2,2-azobis(N,N-dimethylenisobutyramidine) dihydrochloride, 2,2-azobis(4-methoxy-2,4-dimethylvaleronitrile), 2,2-azo-bis(2,4-dimethylvaleronitrile) and 2,2-azobis (2-amidinopropane) di hydrochloride. The amounts used of the initiators are those conventional in the polymerization reaction. It is preferable to use azo initiators as polymerization initiators. However, the polymerization reaction can also be initiated with the aid of energy radiation, such as electron beams, or irradiation with UV light.

The polymerization reaction to form the anionic polymers is by way of example carried out batchwise, by using the monomers and at least one cationic compound as initial charge in a polymerization zone, with portioned or continuous feed of the polymerization initiator. However, preference is given to a semicontinuous procedure in which water and polymerization initiator are used as initial charge and at least one anionic monomer and at least one cationic polymer are fed continuously under polymerization conditions. However, it is also possible to introduce the initiator in a continuous or portioned manner into the polymerization zone, but separately from monomer feed and from cationic-polymer feed. Another possible procedure begins by using a portion of the monomers, e.g. from 5 to 10% by weight, together with a corresponding proportion of at least one cationic polymer as initial charge in a polymerization zone, initiating the polymerization reaction in the presence of an initiator, and adding the remaining portion of the monomers, of the cationic polymer, and of the initiator in continuous or portioned form. The polymerization reaction usually always takes place with exclusion of oxygen under an inert-gas atmosphere, for example under nitrogen or helium. The polymerization temperatures are by way of example in the range from 5 to 100° C., preferably from 15 to 90° C., and mostly from 20 to 70° C. The polymerization temperature is very dependent on the respective initiator used.

The concentration of the polyelectrolyte complexes in the solutions or aqueous dispersions used for the coating process, in particular in the aqueous dispersions produced by water-in-water emulsion polymerization, is preferably at least 1% by weight, in particular at least 5% by weight and up to 50% by weight or up to 60% by weight. The content of polyelectrolyte complexes in the aqueous dispersion is mostly from 1 to 40% by weight or from 5 to 35% by weight, in particular from 15 to 30% by weight.

The viscosity of preferred aqueous dispersions of the polyelectrolyte complexes at pH below 6.0 and at a temperature of 20° C. is from 100 to 150000 mPas, or from 200 to 5000 mPas (measured using a Brookfield viscosimeter at 20° C., 20 rpm, spindle 4). The polyelectrolyte complexes have different molecular weights as a function of the polymerization conditions and of the respective monomers used or combinations of monomers used and auxiliaries used, such as chain transfer agents. The average molecular weight $M_w$ of the polyelectrolyte complexes is by way of example from 1000 to 10 million, preferably from 5000 to 5 million, and is mostly in the range from 10000 to 3 million. The molecular weight is determined with the aid of light scattering. The average particle size of the dispersed polyelectrolyte complexes is by way of example from 0.1 to 200 μm, preferably from 0.5 to 70 μm. It can be determined by way of example with the aid of optical microscopy, or of light scattering, or of freeze-fracture electron microscopy.

Particular embodiments of the invention are the use of polyelectrolyte complexes formed from

- homopolymers of acrylic acid and polymers comprising vinylimidazolium units;
- homopolymers of acrylic acid and homopolymers having vinylimidazolium units;
- homopolymers of acrylic acid and copolymers of monomers having vinylimidazolium units and of vinyllactams, in particular vinylpyrrolidone;
- copolymers of acrylic acid with 2-acrylamido-2-methylpropanesulfonic acid and polymers comprising vinylimidazolium units;
- copolymers of acrylic acid with 2-acrylamido-2-methylpropanesulfonic acid and homopolymers having vinylimidazolium units;
- copolymers of acrylic acid with 2-acrylamido-2-methylpropanesulfonic acid and copolymers of monomers having vinylimidazolium units and of vinyllactams, in particular vinylpyrrolidone.

In one embodiment of the invention, the coating process for the polymer foils uses a composition comprising a polyelectrolyte complex previously produced from anionic polymer and from cationic surfactant. Suitable anionic polymers are the abovementioned polymers. Preferred anionic polymers are composed of acrylic acid or methacrylic acid as single monomers or as monomers alongside nonionic comonomers, examples being polyacrylates composed of acrylic acid or methacrylic acid and also of acrylic or methacrylic esters of monohydric alcohols having from 1 to 20, preferably from 1 to 12, carbon atoms. Suitable cationic surfactants are non-polymeric substances which bear not only a cationic or cationizable group, in particular a protonated amine group, or preferably a quaternary ammonium group, but also a hydrophobic group, such as an alkyl or aryl group having at least 6 carbon atoms.

Preferred cationic surfactants are surfactants which comprise a quaternary ammonium group, e.g. those of the general formula $$N^{(+)}R^1R^2R^3R^4X^{(-)}$$

where $R^1$ to $R^4$, independently of one another, are aliphatic groups, aromatic groups, alkoxy groups, polyoxyalkylene groups, alkylamido groups, hydroxyalkyl groups, aryl groups, or alkaryl groups respectively having from 1 to 22 carbon atoms, where at least one of the radicals $R^1$ to $R^4$ has in each case at least 8 carbon atoms, and where $X^-$ is an anion, such as a halogen, acetate, phosphate, nitrate, or alkyl sulfate, preferably a chloride. The aliphatic groups can also have, in addition to the carbon atoms and the hydrogen atoms, crosslinking bonds, or other groups, such as further amino groups. Examples of suitable cationic surfactants are the chlorides or bromides of alkyldimethylbenzylammonium salts, or alkyltrimethylammonium salts, e.g. cetyltrimethylammonium chloride or the corresponding bromide, tetradecyltrimethylammonium chloride or the corresponding bromide, alkyldimethylhydroxyethylammonium chlorides or the corresponding bromides, dialkyldimethylammonium chlorides or the corresponding bromides, alkylpyridinium salts, e.g. laurylpyridinium chloride or cetylpyridinium chloride, alkylamidoethyltrimethylammonium ether sulfates, and also compounds having cationic character such as amine oxides, e.g. alkylmethylamine oxides or alkylaminoethyldimethylamine oxides. Particular preference is given to cetyltrimethylammonium chloride.

In one embodiment of the invention, at least one side of a polymer foil is coated with at least three alternating layers, where respectively one of two adjacent layers comprises at least one anionic polyelectrolyte component and the other of two adjacent layers comprises at least one cationic polyelectrolyte component, and polyelectrolyte complexes can form at the opposite, adjacent interfaces of the at least three alternating layers. The combination of first to third coating here provides oxygen-barrier properties for the polymer foil.

The preferred method of coating with at least three alternating layers is such that (a1) a first coating, which comprises at least one anionic polymer, is provided on at least one side of the polymer foil, (b1) a second coating, which comprises at least one cationic substance, selected from cationic surfactants and cationic polymers, is provided on the first coating, and (c1) a third coating, which comprises at least one anionic polymer, is provided on the second coating; or such that (a2) a first coating, which comprises at least one cationic substance, selected from cationic surfactants and cationic polymers, is provided on at least one side of the polymer foil, (b2) a second coating, which comprises at least one anionic polymer, is provided on the first coating, and (c2) a third coating, which comprises at least one cationic substance, selected from cationic surfactants and cationic polymers, is provided on the second coating.

The anionic polymers, cationic polymers, and cationic surfactants used can comprise the abovementioned polyelectrolyte components. Preference is given to a sandwich structure made of three layers, where the exterior layers respectively comprise at least one identical or different anionic polymer and the middle layer comprises at least one cationic polymer. Particular anionic polymers are olefin/(meth)acrylic acid copolymers. Particular cationic polymers are polyvinylamines or completely or partially hydrolyzed polyvinylformamides.

Anionic polyelectrolyte components suitable for all embodiments are in particular anionic polymers capable of being produced from monomers selected from the group consisting of monoethylenically unsaturated $C_3$ to $C_{10}$ carboxylic acids, vinylsulfonic acid, styrenesulfonic acid, acrylamidomethylpropanesulfonic acid, vinyiphosphonic acid, and salts of these acids.

Cationic polyelectrolyte components suitable for all embodiments are in particular cationic polymers selected from the group consisting of polymers comprising vinylimidazolium units, polydiallyldimethylammonium halides, polymers comprising vinylamine units, polymers comprising ethyleneimine units, polymers comprising dialkylaminoalkyl acrylate units, polymers comprising dialkylaminoalkyl methacrylate units, polymers comprising dialkylaminoalkylacrylamide units, and polymers comprising dialkylaminoalkyl methacrylamide units, or cationic surfactants selected from the group consisting of compounds of the general formula $$N^{(+)}R^1R^2R^3R^4X^{(-)}$$

where $R^1$ to $R^4$, independently of one another, are alkyl groups respectively having from 1 to 22 carbon atoms, where at least one of the radicals $R^1$ to $R^4$ has in each case at least 8 carbon atoms, and where $X^-$ is an anion, for example a halogen, acetate, phosphate, nitrate, or alkyl sulfate, preferably a chloride.

A preferred combination, particularly for embodiments using alternating layers, is the combination of one or more completely or partially hydrolyzed polyvinylformamides with one or more homopolymers, or copolymer of acrylic acid or methacrylic acid.

When polyelectrolyte complexes are used according to the invention, foil substrates suitable for packaging are coated with an aqueous solution or dispersion of at least one polyelectrolyte complex or, respectively, with at least one component of a polyelectrolyte complex. Particularly suitable substrates are polymer foils. The solutions or dispersions used for the coating process can comprise further additives or auxiliaries, e.g. thickeners for adjusting rheology, wetting aids, or binders.

Polymer foils preferred as backing material are foils made of oriented polypropylene or polyethylene, where the polyethylene can have been produced from ethylene either by the high-pressure polymerization process or by the low-pressure polymerization process. Examples of other suitable backing foils are foils made of polyester, such as polyethylene terephthalate, and foils made of polyamide, polystyrene and polyvinyl chloride. In one embodiment, the backing material is biodegradable foils, e.g. made of biodegradable aliphatic-aromatic copolyesters and/or polylactic acid, an example being Ecoflex® foils or Ecovio® foils. Examples of suitable copolyesters are those formed from alkanediols, in particular C2 to C8 alkanediols, e.g. 1,4-butanediol, and from aliphatic dicarboxylic acids, in particular C2 to C8 dicarboxylic acids, e.g. adipic acid, and from aromatic dicarboxylic acids, e.g. terephthalic acid.

The thickness of the backing foils is generally in the range from 10 to 200 μm, in the case of foils made of polyamide from 30 to 50 μm, in the case of foils made of polyethylene terephthalate from 10 to 40 μm, in the case of foils of polyvinyl chloride about 100 μm, and in the case of foils made of polystyrene about 30-75 μm.

A possible application method by way of example on coating machinery applies the coating composition to a backing foil made of a plastic. If materials in the form of webs are used, the polymer dispersion is usually applied from a trough by way of an applicator roll and rendered uniform with the aid of an air knife. Other successful possibilities for applying the coating use the reverse gravure process, or spray processes, or a spreader system that uses a roll, or other coating processes known to the person skilled in the art.

Suitable processes for producing a barrier coating by means of a polyelectrolyte complex, other than these coating processes, are the known intaglio printing and relief printing processes. Instead of using different inks in the printing-ink units, the process here by way of example uses a printing process for alternate application of the different polymers. Printing processes that may be mentioned are the flexographic printing process as a relief printing process known to the person skilled in the art, the gravure process as an example of intaglio printing, and offset printing as an example of flatbed printing. Modern digital printing, inkjet printing, electrophotography and direct imaging can also be used.

In one embodiment, formation of the polyelectrolyte complex is delayed until it is in situ on the packing material, by applying two, three or more coating compositions simultaneously or in one operation directly in succession, e.g. via a cascade coating process, where one of the coating compositions comprises at least one anionic polymer and the other coating composition comprises at least one cationic polymer. It is preferable here to begin by applying at least one first coating composition which comprises at least one cationic polymer having primary, secondary, or tertiary amino groups, and then to apply at least one second coating composition which comprises at least one anionic polymer having acid groups. Examples of the cationic polymers having amino groups are polymers having units selected from the group consisting of vinylamine, ethyleneimine, dialkylaminoalkyl acrylate, dialkylaminoalkyl methacrylate, dialkylaminoalkylacrylamide, dialkylaminoalkylmethacrylamide, and mixtures of these; in particular polyvinylamines, polyethyleneimines, polydimethylaminoethyl acrylate, polydimethylaminoethyl methacrylate, copolymers of acrylamide and dimethylaminoethyl acrylate, and copolymers of acrylamide and dimethylaminoethyl methacrylate. Examples of the anionic polymers having acid groups are polymers having units selected from acrylic acid, methacrylic acid, maleic acid, 2-acrylamido-2-methylpropanesulfonic acid, and mixtures thereof, in particular homopolymers of acrylic acid and copolymers of acrylic acid and of 2-acrylamido-2-methylpropanesulfonic acid.

In order to achieve a further improvement in adhesion on a foil, the backing foil can have been previously subjected to corona treatment. Examples of the amounts applied to the sheet materials are preferably from 1 to 10 g (polymer, solid) per $m^2$, preferably from 2 to 7 $g/m^2$ in the case of foils, or preferably from 10 to 30 $g/m^2$ in the case of paper or paperboard. Once the polyelectrolyte complexes have been applied to the sheet substrates, the solvent is evaporated. For this, by way of example, in the case of continuous operation, the material can be passed through a drying tunnel, which can have an infrared irradiation apparatus. The coated and dried material is then passed over a cooling roll and finally wound up. The thickness of the dried coating is preferably from 0.5 to 50 μm, particularly preferably from 2 to 20 μm.

The substrates coated with the polyelectrolyte complex exhibit excellent oxygen-barrier action, in particular even if buckling, creasing, and angling occurs. The coated substrates can be used as they stand as means of packaging, preferably for foods. The coatings have very good mechanical properties and exhibit, for example, good behavior in relation to blocking and in essence no cracking.

In order to obtain specific surface properties or specific coating properties from the means of packaging, for example good printability, or a still further improvement in behavior in relation to sealing and blocking, or good water-resistance, it can be advantageous to overcoat the coated substrates with topcoat layers which provide these desired additional properties. The substrates precoated with polyelectrolyte complexes can readily be overcoated. For the overcoating process, one of the processes mentioned above can be repeated, or repeated coating can be carried out in a continuous process without any intervening wind-up and unwind of the foil. The location of the oxygen barrier layer is thus in the interior of the system, and the surface properties are then determined by the topcoat layer. The topcoat layer has good adhesion to the fat-barrier layer. It is particularly preferable to apply a moisture-protection coating, which ensures that the oxygen-barrier layer is effective even at relatively high humidity levels.

EXAMPLES

Measurement of oxygen-barrier action:

Oxygen transmission or oxygen permeability was determined on coatings on polymer foils at each of the relative humidity levels stated. Oxygen transmission is first measured here and then converted to the value for a layer thickness of 1 μm, and stated as oxygen permeability using the unit $cm^3$ (1 μm)/($m^2$×d×bar), where d is the time in days. The determination method is based on ASTM D3985.

Example 1

Three-layer Barrier

Foil A (comparison):

Polymer foil made of polyethylene terephthalate, thickness 25 μm

Foil B (comparison):

A polymer foil made of polyethylene terephthalate, thickness 25 μm, was coated with a layer made of 10 parts by weight of ethylene/methacrylic acid copolymer and of 90 parts by weight of poly(ethyl acrylate), thickness 13 μm.

Foil C (inventive):

A polymer foil made of polyethylene terephthalate, thickness 25 μm, was coated with a first layer made of 10 parts by weight of ethylene/methacrylic acid copolymer and of 90 parts by weight of poly(ethyl acrylate), thickness 8 μm. It was then coated with a second layer made of polyvinylamine (poly(N-vinylformamide) hydrolyzed to an extent of more 95%), thickness 4 μm. Finally, the foil was coated with another layer made of 10 parts by weight of ethylene/methacrylic acid copolymer and of 90 parts by weight of poly (ethyl acrylate), thickness 8 μm (third layer). Polyelectrolyte complexes form at the interface between first and second layer and between second and third layer. Oxygen-barrier action was measured at 0% relative humidity.

Oxygen transmission, foil A: 70 $cm^3$/($m^2$×d)

Oxygen transmission, foil B: 90 $cm^3$/($m^2$×d)

Oxygen transmission, foil C: 3 $cm^3$/($m^2$×d)

Oxygen permeability, foil C: 60 $cm^3$ (1 μm)/($m^2$×d×bar)

Example 2

A polymer foil made of oPP (oriented polypropylene), thickness 30 μm, was coated with a W/W dispersion of a polyelectrolyte complex made of cetyltrimethylammonium chloride (CTAC) and of a copolymer of 80 parts by weight of acrylic acid, 10 parts by weight of hydroxyethyl acrylate, and 10 parts by weight of methyl acrylate, neutralized with NaOH. The W/W dispersion of the polyelectrolyte complex was produced via mixing of the copolymer with the cationic surfactant in water. CTAC is added as complexing agent. The mixture is stirred until a homogeneous emulsion is produced. NaOH is then added to stabilize the emulsion. The thickness of the layer of the polyelectrolyte complex on the oPP foil was 3 μm. Oxygen-barrier action was measured at 50% relative humidity.

Oxygen permeability: 62 $cm^3$ (1 μm)/($m^2$×d×bar)

Example 3

IR Measurements to Demonstrate Formation of Polyelectrolyte Complexes

In a first experiment, polyacrylic acid (35% strength in water) and polyvinylamine (6.1% strength in water) were mixed in a ratio by weight of 1:1.7 and stirred. An IR spectrum of the resultant solid reaction product was recorded. The IR spectrum showed that the absorptions due to the NH vibrations (3300 $cm^{-1}$) of the polyvinylamine had disappeared, and that new absorptions had appeared, due to the carboxylate ion, at 1530 $cm^{-1}$ and 1390 $cm^{-1}$. This indicates formation of a polyelectrolyte complex.

In a second experiment, films of polyacrylic acid and of polyvinylamine were mutually superposed in approximately the same ratio by weight on a ZnSe window. The transmission IR spectrum of the double film was recorded, and the difference spectrum with respect to double film and polyvinylamine was calculated. The absorptions due to the carboxylate ion at 1530 $cm^{-1}$ and 1390 $cm^{-1}$ are present in the difference spectrum, and good agreement is apparent with the spectrum of the polyelectrolyte complex from the first experiment. This indicates that a polyelectrolyte complex has formed at the common interface between the two films of the double film.

The invention claimed is:

1. A method of coating a polymer foil, the method comprising applying a mixture to at least one side of the polymer foil, wherein the mixture comprises (i) an aqueous dispersion comprising a dispersed polyelectrolyte complex comprising a cationic polymer produced by water-in-water emulsion polymerization, wherein the cationic polymer is a polymer comprising a vinylimidazolium unit, a polymer comprising a vinylamine unit, a polymers comprising a dialkylaminoalkyl acrylate unit, a polymer comprising a dialkylaminoalkyl methacrylate unit, a polymer comprising a dialkylaminoalkylacrylamide unit, a polymer comprising a dialkylaminoalkyl methacrylamide unit, or a combination thereof; or (ii) a composition comprising a polyelectrolyte complex produced from an anionic polymer and a non-polymeric cationic surfactant, or applying at least three alternating layers to at least one side of the polymer foil, where a first layer of any two adjacent layers comprises an anionic polyelectrolyte component and a second layer of the two adjacent layers comprises a cationic polyelectrolyte component, and polyelectrolyte complexes can form at the interfaces of the at least three alternating layers, to obtain a coated polymer foil.

2. The method of claim 1, further comprising adding a moisture-protection system.

3. The method of claim 2, wherein the adding a moisture-protection system is by coating with a polyolefin or by coextrusion of a polyolefin with at least one substance selected from a polyelectrolyte complex, an anionic polyelectrolyte component, and a cationic polyelectrolyte component.

4. The method of claim 1, comprising applying at least three alternating layers to at least one side of the polymer foil, wherein (a1) a first layer comprises an anionic polymer, (b1) a second layer, on the first layer, comprises at least one cationic substance selected from a cationic surfactant and a cationic polymer, and (c1) a third layer, on the second layer, comprises an anionic polymer; or wherein (a2) a first layer comprises at least one cationic substance selected from a cationic surfactant and a cationic polymer, (b2) a second layer, on the first layer, comprises an anionic polymer, and (c2) a third layer, on the second layer, comprises at least one cationic substance selected from a cationic surfactant and a cationic polymer.

5. The method of claim 1, wherein the anionic polyelectrolyte component comprises an anionic polymer comprising, in reacted form, a monomer selected from the group consisting of a monoethylenically unsaturated $C_3$ to $C_{10}$ carboxylic acid, vinylsulfonic acid, styrenesulfonic acid, acrylamidomethylpropanesulfonic acid, vinylphosphonic acid, a salt of a monoethylenically unsaturated $C_3$ to $C_{10}$ carboxylic acid, a salt of vinylsulfonic acid, a salt of styrenesulfonic acid, a salt of acrylamidomethylpropanesulfonic acid, and a salt of vinylphosphonic acid.

6. The method of claim 1, wherein the cationic is polyelectrolyte component comprises a completely or partially hydrolyzed polyvinylformamide, and the anionic polyelectrolyte component comprises a homopolymer or a copolymer of acrylic acid or of methacrylic acid.

7. The method of claim 1, wherein the applying comprises applying two coating compositions simultaneously or in one operation directly in succession, where one of the coating compositions comprises an anionic polymer and the other coating composition comprises a cationic polymer.

8. The method of claim 1, wherein the mixture comprises an aqueous dispersion comprising a dispersed polyelectrolyte complex produced by water-in-water emulsion polymerization, wherein the dispersion comprises 1 to 40% by weight, based on a weight of the dispersion, of dispersed polyelectrolyte complex.

9. The method of claim 1, wherein the polymer foil comprises polyethylene terephthalate, oriented polypropylene, polyethylene, or a biodegradable aliphatic-aromatic copolyester.

10. A coated polymer foil obtained by the method of claim 1, wherein the method comprises applying at least three alternating layers to at least one side of the polymer foil.

11. The method of claim 1, wherein the method provides an oxygen barrier for a packaging material comprising a polymer foil.

12. The method of claim 1, wherein the mixture comprises an aqueous dispersion comprising a dispersed polyelectrolyte complex produced by water-in-water emulsion polymerization, wherein the dispersed polyelectrolyte complex comprises 10 to 80 mol of anionic groups of an anionic polymer, measured at pH 2.7 and 20° C., based on 100 mol of cationic groups of a cationic polymer.

13. The method of claim 1, wherein the mixture comprises an aqueous dispersion comprising a dispersed polyelectrolyte complex produced by water-in-water emulsion polymerization, wherein the dispersion comprises 15 to 30% by weight, based on a weight of the dispersion, of dispersed polyelectrolyte complex.

14. The coated polymer foil of claim 10, having an oxygen permeability of less than 30%, based on an oxygen permeability of an uncoated polymer foil, measured at 23° C. and 0% relative humidity.

15. The coated polymer foil of claim 10, having an oxygen permeability of less than 3%, based on an oxygen permeability of an uncoated polymer foil, measured at 23° C. and 0% relative humidity.

* * * * *